United States Patent
Park et al.

(10) Patent No.: US 7,614,072 B2
(45) Date of Patent: Nov. 3, 2009

(54) METHOD FOR SERVING MULTIMEDIA DATA ON DEMAND USING DYNAMIC CHANNEL AND APPARATUS THEREOF

(75) Inventors: Sung-Kwon Park, Seoul (KR); Suk-Won Lee, Gwangiu-si (KR); Kyung-Jin Seo, Seoul (KR)

(73) Assignee: Hanyang Hak Won Co., Ltd., Seoul (KR)

(*) Notice: Subject to any disclaimer, the term of this patent is extended or adjusted under 35 U.S.C. 154(b) by 567 days.

(21) Appl. No.: 11/399,117

(22) Filed: Apr. 6, 2006

(65) Prior Publication Data

US 2006/0179464 A1   Aug. 10, 2006

Related U.S. Application Data

(63) Continuation of application No. PCT/KR03/02905, filed on Dec. 30, 2003.

(30) Foreign Application Priority Data

Oct. 16, 2003   (KR) ...................... 10-2003-0072296

(51) Int. Cl.
*H04N 7/173* (2006.01)
(52) U.S. Cl. ........................ 725/101; 725/87; 725/104
(58) Field of Classification Search .................. 725/86, 725/87, 101–104, 91, 94, 95; 709/217–219
See application file for complete search history.

(56) References Cited

U.S. PATENT DOCUMENTS

| 6,263,504 | B1* | 7/2001 | Ebisawa | 725/101 |
| 7,107,606 | B2* | 9/2006 | Lee | 725/87 |
| 7,174,384 | B2* | 2/2007 | Cheung et al. | 709/231 |

FOREIGN PATENT DOCUMENTS

| KR | 10-1997-4853 | 1/1997 |
| KR | 10-1998-7675 | 3/1998 |
| KR | 10-1999-52958 | 7/1999 |
| KR | 10-2002-24700 | 4/2002 |

* cited by examiner

*Primary Examiner*—Christopher Kelley
*Assistant Examiner*—Alazar Tilahun
(74) *Attorney, Agent, or Firm*—Knobbe Martens Olson & Bear LLP

(57) ABSTRACT

A method of transmitting multimedia data on demand by using a dynamic channel and apparatus thereof are disclosed. In one embodiment, the method includes i) continuously transmitting the multimedia data from beginning to end via a first static channel at a first static channel transmission point, ii) transmitting a portion of the multimedia data from beginning via a first to $d^{th}$ (d is a natural number not less than 1) dynamic channel at a first to $d^{th}$ dynamic channel transmission point and iii) reusing $k^{th}$ (k is more than 1 and less than d) dynamic channel as another dynamic channel after releasing the $k^{th}$ dynamic channel to be available after Tk from the $k^{th}$ dynamic channel transmission point, wherein the Tk is not less than an elapsed time from the first static channel transmission point to the $k^{th}$ dynamic channel transmission point.

10 Claims, 12 Drawing Sheets

FIG. 7A

| D/T | $N_{tt}$ | Optimum d | D/T | $N_{tt}$ | Optimum d |
|---|---|---|---|---|---|
| 1 | 1 | 0 | 26 | 7 | 6,8 |
| 2 | 2 | 0,1 | 27 | 7 | 6,8 |
| 3 | 2 | 2 | 28 | 7 | 6 |
| 4 | 3 | 1,2,3 | 29 | 8 | 4,5,6,7,8,9,10 |
| 5 | 3 | 2,4 | 30 | 8 | 4,5,6,7,8,9,10 |
| 6 | 3 | 2 | 31 | 8 | 6,7,8,10 |
| 7 | 4 | 2,3,4,6 | 32 | 8 | 6,7,8,10 |
| 8 | 4 | 2,3,4 | 33 | 8 | 6,8,10 |
| 9 | 4 | 3,5,6,8 | 34 | 8 | 6,8 |
| 10 | 4 | 4 | 35 | 8 | 6,8 |
| 11 | 5 | 2,3,4,5,6 | 36 | 8 | 8 |
| 12 | 5 | 2,3,4,5,6 | 37 | 9 | 6,7,8,9,10,12 |
| 13 | 5 | 4,6 | 38 | 9 | 6,7,8,9,10,12 |
| 14 | 5 | 4,6 | 39 | 9 | 6,7,8,9,10,12 |
| 15 | 5 | 4 | 40 | 9 | 6,7,8,9,10 |
| 16 | 6 | 3,4,5,6,7,8 | 41 | 9 | 6,8,10 |
| 17 | 6 | 4,5,6,8 | 42 | 9 | 6,8,10 |
| 18 | 6 | 4,5,6,8 | 43 | 9 | 8,10 |
| 19 | 6 | 4,6 | 44 | 9 | 8,10 |
| 20 | 6 | 4,6 | 45 | 9 | 8 |
| 21 | 6 | 6 | 46 | 10 | 6,7,8,9,10,11,12 |
| 22 | 7 | 4,5,6,7,8,10 | 47 | 10 | 6,7,8,9,10,11,12 |
| 23 | 7 | 4,5,6,7,8 | 48 | 10 | 6,7,8,9,10,11,12 |
| 24 | 7 | 4,5,6,7,8 | 49 | 10 | 6,8,9,10,12 |
| 25 | 7 | 4,6,8 | 50 | 10 | 8,9,10,12 |

FIG. 7B

| D/T | $N_{tt}$ | Optimum d |
|---|---|---|
| 51 | 10 | 8, 10, 12 |
| 52 | 10 | 8, 10, 12 |
| 53 | 10 | 8, 10 |
| 54 | 10 | 8, 10 |
| 55 | 10 | 10 |
| 56 | 11 | 6, 7, 8, 9, 10, 11, 12, 13, 14 |
| 57 | 11 | 8, 9, 10, 11, 12, 14 |
| 58 | 11 | 8, 9, 10, 11, 12, 14 |
| 59 | 11 | 8, 9, 10, 11, 12, 14 |
| 60 | 11 | 8, 9, 10, 11, 12, 14 |
| 61 | 11 | 8, 10, 12 |
| 62 | 11 | 8, 10, 12 |
| 63 | 11 | 8, 10, 12 |
| 64 | 11 | 10, 12 |
| 65 | 11 | 10, 12 |
| 66 | 11 | 10 |
| 67 | 12 | 8, 9, 10, 11, 12, 13, 14, 15, 16 |
| 68 | 12 | 8, 9, 10, 11, 12, 13, 14, 15, 16 |
| 69 | 12 | 8, 9, 10, 11, 12, 13, 14 |
| 70 | 12 | 8, 9, 10, 11, 12, 13, 14 |

| D/T | $N_{tt}$ | Optimum d |
|---|---|---|
| 71 | 12 | 8, 10, 11, 12, 14 |
| 72 | 12 | 8, 10, 11, 12, 14 |
| 73 | 12 | 10, 12, 14 |
| 74 | 12 | 10, 12, 14 |
| 75 | 12 | 10, 12, 14 |
| 76 | 12 | 10, 12 |
| 77 | 12 | 10, 12 |
| 78 | 12 | 10 |
| 79 | 13 | 8, 9, 10, 11, 12, 13, 14, 15, 16 |
| 80 | 13 | 8, 9, 10, 11, 12, 13, 14, 15, 16 |
| 81 | 13 | 8, 10, 11, 12, 13, 14, 16 |
| 82 | 13 | 10, 11, 12, 13, 14, 16 |
| 83 | 13 | 10, 11, 12, 13, 14, 16 |
| 84 | 13 | 10, 11, 12, 13, 14, 16 |
| 85 | 13 | 10, 12, 14, 16 |
| 86 | 13 | 10, 12, 14 |
| 87 | 13 | 10, 12, 14 |
| 88 | 13 | 10, 12, 14 |
| 89 | 13 | 12, 14 |
| 90 | 13 | 12, 14 |

METHOD FOR SERVING MULTIMEDIA DATA ON DEMAND USING DYNAMIC CHANNEL AND APPARATUS THEREOF

RELATED APPLICATIONS

This application is a continuation application, and claims the benefit under 35 U.S.C. §§ 120 and 365 of PCT Application No. PCT/KR2003/002905, filed on Dec. 30, 2003 and published on Apr. 28, 2005, in English, which is hereby incorporated by reference.

BACKGROUND OF THE INVENTION

1. Field of Invention

The present invention relates to a multimedia data transmission or broadcasting, particularly, a Video on Demand (VoD) method for transmitting multimedia data such as movie or video data according to the request of a subscriber and an apparatus thereof.

2. Description of the Related Technology

VoD technology can be classified into true VoD (TVoD) scheme, which provides one channel to a subscriber who requests video data so that each subscriber occupies a channel respectively, and near VoD (NVoD) scheme, which transmits a certain video stream periodically and can serve a plurality of subscribers by a single channel. The NVoD scheme, comparing to the TVoD scheme, can accommodate more subscribers at the same time and is very useful when broadcasting, for example, a popular video movie that many subscribers want to watch simultaneously.

A conventional NVoD system broadcasts video data via a static channel repeatedly and periodically. Specifically, the conventional NVoD system broadcasts each full video data through more than one static channel. Each static channel starts to transmit video data by a certain period.

A video data is an aggregate of large volume data such as moving picture and sound so that relatively large channel bandwidth, which costs much, is required in order to transmit the video data via network. In the NVoD scheme, the channel bandwidth is closely related to waiting time during which a subscriber waits to watch video. In particular, if the channel bandwidth, i.e., the number of channels, is increased, the waiting time can be reduced. But, the channel bandwidth is a finite and valuable resource, so it is important to increase the efficiency of channel bandwidth in order to transmit a video data stream as many as possible via the same number of channels.

SUMMARY OF CERTAIN INVENTIVE ASPECTS

One aspect of the present invention provides an NVoD service method of increasing the efficiency of channel bandwidth by use of dynamic channels and apparatus thereof.

Another aspect of the present invention provides an NVoD service method of reducing the number of required channel or the waiting time under the same condition required in the conventional NVoD system and apparatus thereof.

Another aspect of the present invention provides a method of serving a multimedia data on demand and a computer-readable medium thereof. In one embodiment, the method comprises i) continuously transmitting the multimedia data from beginning to end via a first static channel at a first static channel transmission point, ii) transmitting a portion of the multimedia data from beginning via a first to $d^{th}$ (d is a natural number not less than 1) dynamic channel at a first to $d^{th}$ dynamic channel transmission point, iii) reusing $k^{th}$ (k is more than 1 and less than d) dynamic channel as another dynamic channel after releasing the $k^{th}$ dynamic channel to be available after Tk from the $k^{th}$ dynamic channel transmission point, wherein the Tk is not less than an elapsed time from the first static channel transmission point to the $k^{th}$ dynamic channel transmission point, and iv) continuously transmitting the multimedia data from beginning to end via a second static channel at a second static channel transmission point. Each of the first to the $d^{th}$ dynamic channel among plural channels is available at each dynamic channel transmission point, and the $k^{th}$ dynamic channel transmission point locates at any point between the first static channel transmission point and the second static channel transmission point and becomes closer to the second static channel transmission point as k increases.

In one embodiment, the $k^{th}$ dynamic channel transmission point has a time interval of '$k \times T$' (T is a real number not less than 0) from the first static channel transmission point, and the $T_k$ is '$k \times T$'.

Another aspect of the present invention provides a method of serving a multimedia data on demand. In one embodiment, the method comprises i) transmitting all the multimedia data via a first and a second static channel, ii) transmitting a portion of the multimedia data via a first to a $d^{th}$ (d is a natural number not less than 1) dynamic channel that locate between the first and the second static channel, and iii) releasing the first to the $d^{th}$ dynamic channel, wherein the first static channel, the first to the $d^{th}$ dynamic channel and the second static channel successively start to transmit the multimedia data by an interval of T (T is a real number not less than 0), and the first to the $d^{th}$ dynamic channel can be reused after being released.

In one embodiment, the $k^{th}$ ($1 \leq k \leq d$) dynamic channel is released after time kT passes from the $k^{th}$ dynamic channel transmission point.

Another aspect of the present invention provides a method of serving a multimedia data on demand and a computer-readable medium thereof. In one embodiment, the method comprises i) receiving a multimedia data request from a subscriber, ii) determining a nearest upcoming channel from the time of receiving the multimedia data request, iii) determining that the nearest upcoming channel is a dynamic channel or a static channel, receiving all the multimedia data via the static channel from beginning to end if the nearest upcoming channel is the static channel, iv) receiving the multimedia data via the dynamic channel if the nearest upcoming channel is the dynamic channel, and at the same time, v) storing in a storage the multimedia data received through the static channel that has started to transmit before the dynamic channel, and vi) outputting the stored multimedia data when a first amount of time passes from the start point of the dynamic channel.

Still another aspect of the present invention provides a subscriber apparatus for serving multimedia data on demand. In one embodiment, the apparatus comprises i) a first data receiver for receiving the multimedia data via a static channel, ii) a second data receiver for receiving the multimedia data via a dynamic channel, iii) a storage for temporarily storing the video data received through the static channel, iv) a switch for switching from the first data receiver to the storage, and v) a controller for controlling the switch, wherein the multimedia data being outputted by the switch is displayed to a subscriber.

BRIEF DESCRIPTION OF THE DRAWINGS

FIGS. 7a and 7b are tables for showing the number of total channels $N_{t1}$ and the optimal value of d when D/T varies from 1 to 90.

DETAILED DESCRIPTION OF CERTAIN INVENTIVE EMBODIMENTS

Embodiments of the invention will be described with reference to the drawings. The same reference numbers in each drawing indicates the same element. Before describing embodiments of the present invention, the concept of the present invention can be summarized as follow.

One embodiment of the present invention uses dynamic channels in order to increase the efficiency of channel bandwidth. In one embodiment, dynamic channels are located between the static channels, and the static channels and dynamic channels start at a certain time interval.

Figure 1:
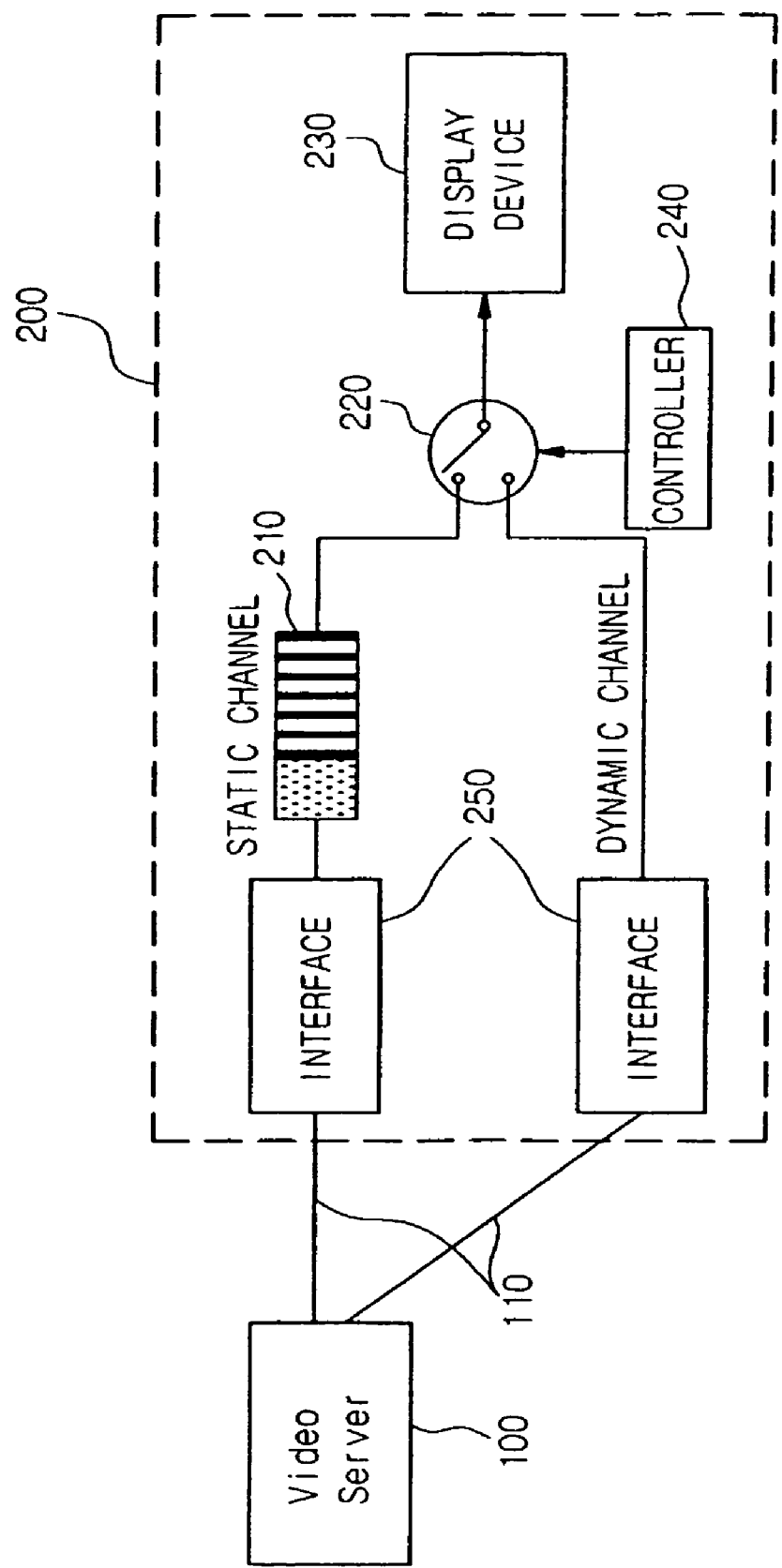
FIG. 1 shows an NVoD system according to one embodiment of the present invention.

FIG. 1 shows an NVoD system according to one embodiment of the present invention. Referring to FIG. 1, the NVoD system comprises a video server 100, a network 10 and a subscriber apparatus 200.

The video server 100 transmits video data by use of a static channel and a dynamic channel. The video server 100 transmits to the subscriber apparatus 200 video data extracted from a self-containing storage (not shown) or video data provided from a video provider (not shown) being coupled through the network or a dedicated line. Video data is delivered to the subscriber apparatus 200 via the network 110. The network 10 can be one of a wired network, a wireless network and a combination thereof.

The network comprises logical channels that can be divided in the static channel and the dynamic channel. A static channel and a dynamic channel are shown as divided in FIG. 1 for the purpose of description. But, it is only a logical division and does not mean that a physically separate network or channel must be used.

The subscriber apparatus 200 comprises a buffer 210, a switch 220, a display device 230, a controller 240 and an interface card 250. The buffer 210 temporarily stores video data received from the video server 100. In one embodiment, the buffer 210 is used in the static channel side. That is, the buffer 210 stores video data received through the static channel. The switch 220 switches between the static channel and the dynamic channel, especially, from the dynamic channel to the static channel. When being switched to the static channel, video data is outputted through the buffer 210. That is, video data stored in the buffer 210 is output, and new video data received through the static channel is input into the buffer 210.

The display device 230 displays video data received from the static channel or the dynamic channel. Examples of the display device 230 are a PC or a TV The controller 240 controls the whole operation of the subscriber apparatus 200.

The controller 240 also controls the switch 220 to switch from the dynamic channel to the static channel, i.e., the buffer.

The interface card 250 interfaces the network 110. Although the interface card 250 is shown as being divided into a static channel interface and a dynamic channel interface, this is a logical division and it does not mean that two physical interface cards must be used. In one embodiment, the buffer 210, the switch 220, the controller 240 and the interface card 250, except display device 230, can be embodied as a set-top box.

Video data is periodically transmitted via the static channel and the dynamic channel, for example, by the same way of the conventional NVoD scheme. The static channel continuously transmits video data from the beginning to the end, and the dynamic channel is located between the adjacent static channels. In one embodiment, the static channel transmits whole video data from the beginning to the end and is never released. The dynamic channel transmits a portion of video data from the beginning and is released after a certain period of time passes. After the dynamic channel is released, the subscriber will receive video data through the static channel.

In one embodiment, both video server 100 and the subscriber apparatus 200 have information regarding a transmission schedule in advance. If a subscriber requests a transmission of video data, he will be served as the same way as the conventional NVoD scheme from the nearest upcoming video channel based on the requesting time. The nearest video channel from the requesting time can be either a static channel or a dynamic channel. In one embodiment, the subscriber apparatus 200 performs the following procedure after recognizing which one of static channels and dynamic channels is a serving video channel. For example, according to a determined serving video channel, there may be two cases, and the processes of each case can be described as follows.

Figure 2:
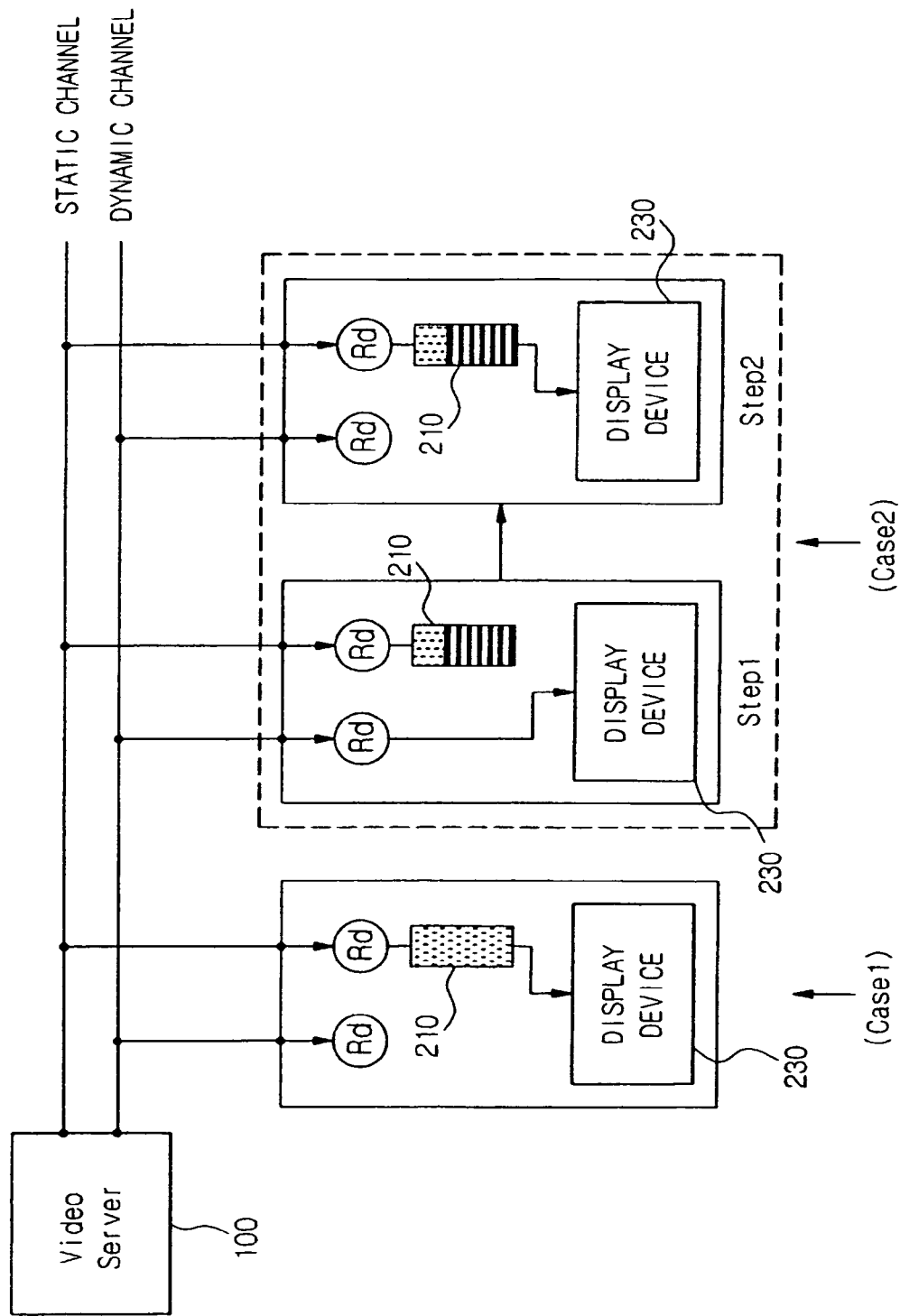
FIG. 2 shows two processes of the subscriber apparatus.

FIG. 2 shows two processes of the subscriber apparatus. In the first case, the serving video channel is a static channel. In this case, the subscriber apparatus 200 receives video data through the static channel from the beginning to the end without storing video data in the buffer 210.

In the second case, the serving channel is a dynamic channel. In this case, the subscriber apparatus 200 starts a video service by use of the dynamic channel. Simultaneously, the subscriber apparatus 200 stores video data at the buffer 210 from any nearest static channel that started prior to the serving dynamic channel. After a certain period of time passes, the dynamic channel is released. Then, the subscriber apparatus 200 switches from the dynamic channel to the static channel, and continues reproducing video data stored in the buffer 210 of the static channel side. The released dynamic channel is re-used as another dynamic channel.

Figure 3:
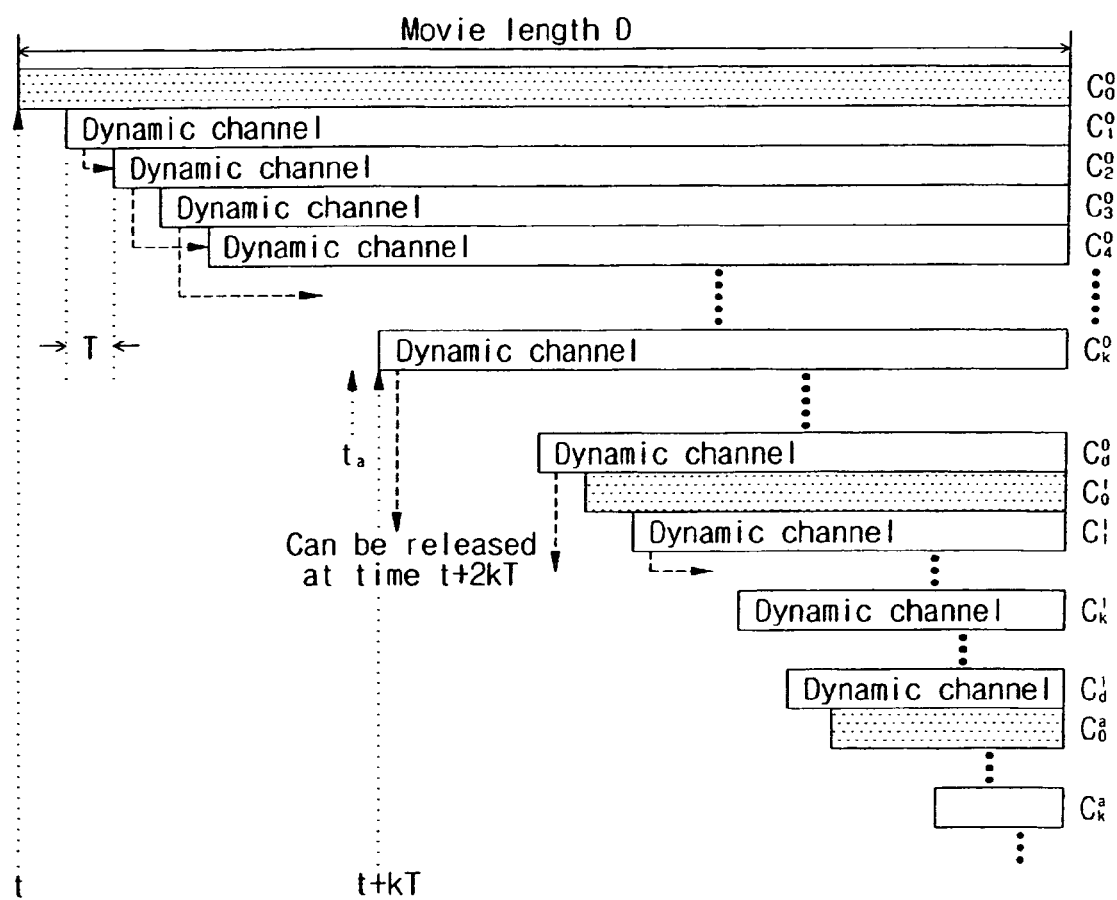
FIG. 3 shows one embodiment of using a static channel and a dynamic channel for one video service.

FIG. 3 shows one embodiment of using a static channel and a dynamic channel for one video service. M channel sets as shown in FIG. 3 will appear in the NVoD system that is providing M videos.

Before describing the FIG. 3 embodiment, the number of channels in the conventional NVoD system will be described in brief.

In the conventional NVoD system, the number of required channels Nn when transmitting M videos having each length of D by a period of T can be determined as follows:

$$N_n = M \times \frac{D}{T} \quad \text{Equation 1}$$

Where, period T indicates an interval between two neighboring video channels, and is also the maximum waiting time of a subscriber. For example, if the same video starts at every 10 minute, period T is 10 minutes. Thus, the number of channels for providing one video comes from dividing length D by period T. If M videos are serviced, then the total number of channels Nn comes from multiplying the number of channels for one video (D/T) by the number of videos M.

Referring to FIG. 3, the video channels are divided into static channels and dynamic channels, and the dynamic channels are located between adjacent static channels. If parameter d indicates the number of dynamic channels that are located between one static channel transmitting same video and the next static channel, d has a range as following:

$$0 \leq d \leq \left(\frac{N_n}{M} - 1\right) \quad \text{Equation 2}$$

Where, Nn is the total number of used video channels, and M is the total number of videos that are served. If d=0, as it means there is no dynamic channels between static channels, this system is the conventional NVoD system. And, if $$d = \left(\frac{N_n}{M} - 1\right),$$

as it means that all channels except one are dynamic channels, only one static channel is used during video length D.

Number of static channels $N_{s1}$ for one video that exist during video length D can be expressed as follows:

$$N_{s1} = \left\lceil \frac{D}{T(d+1)} \right\rceil \quad \text{Equation 3}$$

Where, ⌈ ⌉ means rounding up. T indicates, as already described, an interval between neighboring channels, i.e., a period.

Thus, if M videos are serviced, the number of total static channels $N_s$ can be expressed as follows:

$$N_s = M \times \left\lceil \frac{D}{T(d+1)} \right\rceil \quad \text{Equation 4}$$

In FIG. 3, $C_k^a$ is a symbol for numbering a channel. Parameter a is for numbering a static channel and its value may be 0, 1, 2, 3, . . . . Parameter k is a natural number from 1≦k≦d, and is for numbering a dynamic channel existing between two neighboring static channels.

Thus, $C_o^o$ indicates the '0'th static channel. $C_1^o$ indicates the '1'th dynamic channel existing right after the '0'th static channel. Assuming that start point of the $C_o^o$ channel is 't', as the interval between channels, i.e., the period that video is repeated is T, the start point of $C_1^o$ channel is 't+T'. $C_k^o$ indicates the 'k'$^{th}$ dynamic channel after the '0'th static channel and its start point is 't+kT'. $C_o^1$ indicates the '1'$^{th}$ static channel, $C_k^1$ is the 'k'$^{th}$ dynamic channel after the '1' static channel, and $C_k^a$ the 'k'$^{th}$ dynamic channel after the 'a'$^{th}$ static channel.

As shown in FIG. 3, if a video request of a subscriber arrives at $t_a$ (t+(k−1)T<$t_a$<t+kT), the subscriber apparatus 200 (in FIG. 1) starts to receive video data at 't+KT' from the $k^{th}$ dynamic channel ($C_k^o$). The $k^{th}$ dynamic channel can be released after time kT passes, i.e., at 't+2kT', and can be reused as the '2k'$^{th}$ dynamic channel.

If a subscriber requests video at between 't' and 't+T', video data from the $C_1^o$ dynamic channel can be reproduced at 't+T'. At the same time, the subscriber apparatus 200 starts to store video data from the nearest upcoming static channel $C_o^o$ that was already started prior to $C_1^o$ in the buffer 210 (in FIG. 1). From 't+2T', the video data that was stored in the buffer 210 can be reproduced. Thus, the $C_1^o$ dynamic channel is released at 't+2T', and can be reused as the '2'$^{th}$ dynamic channel $C_2^o$.

If a subscriber requests video at between 't+T' and 't+2T', video data from $C_2^o$ dynamic channel can be reproduced at 't+2T'. At the same time, the subscriber apparatus 200 starts to store video data from the nearest upcoming static channel $C_o^o$ that was already started prior to $C_2^o$ in the buffer. From 't+4T', the video data that was stored in the buffer can be reproduced. Thus, the $C_2^o$ dynamic channel is released at 't+4T', and can be reused as the '4'$^{th}$ dynamic channel $C_4^o$.

Assuming that the dynamic channels are reused, since the dynamic channels are located between the static channels, the reuse rule of dynamic channels can be derived as follows.

If k is d/2 or below, $C_k^a$ dynamic channels can be reused as $C_{2k}^a$ dynamic channels. If k is more than d/2, $C_k^a$ dynamic channels can be reused as $C_{2(k-\lfloor d/2 \rfloor)-1}^{a+1}$ dynamic channels, where ⌊ ⌋ indicates rounding down.

When considering one video of which a repetition period is T in the VoD scheme using a dynamic channel as described above, the number of total channels $N_{t1}$ can be expressed as follows:

$$N_{t1} = N_{s1} + N_{d1} = \left\lceil \frac{D}{T(d+1)} \right\rceil + \left\lceil \frac{d}{2} \right\rceil \quad \text{Equation 5}$$

Figure 8:
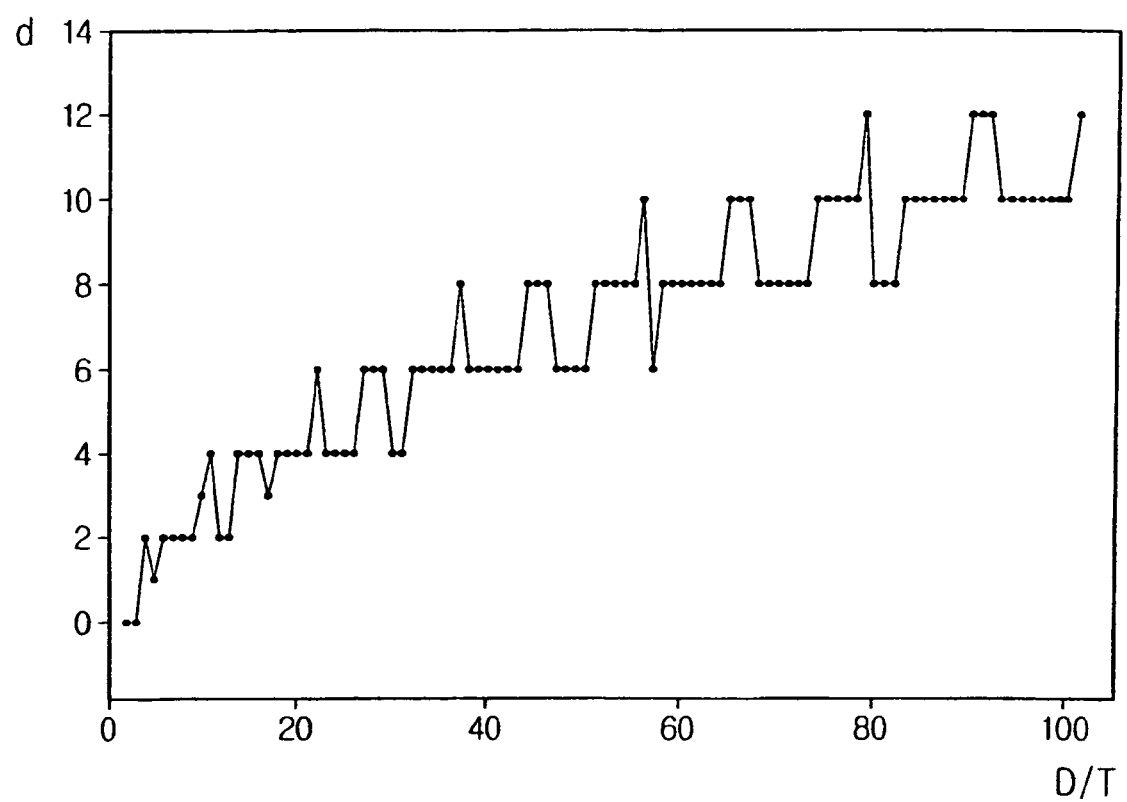
FIG. 8 shows FIGS. 7a and 7b in graph.

Where, $N_{s1}$ is the number of static channels, and $N_{d1}$ is the number of dynamic channel. Namely, $N_{d1}$ is the number of dynamic channels required for assigning dynamic channels d times between static channels by an interval of T. The optimal d for minimizing $N_{t1}$ changes according to the value of D/T, and there are more than one optimal d for one value of D/T. FIGS. 7a and 7b are tables for showing the number of total channels $N_{t1}$ and the optimal value of d when D/T varies from 1 to 90. FIG. 8 shows FIGS. 7a and 7b in graph.

The number of total channels Nt when transmitting M videos by a period of T can be expressed as follows:

$$N_t = N_s + N_d = M \times \left[ \left\lceil \frac{D}{T(d+1)} \right\rceil + \left\lceil \frac{d}{2} \right\rceil \right] \quad \text{Equation 6}$$

Where, $N_s$ is the number of total static channels, and $N_d$ is the number of total dynamic channels.

In one embodiment, the size of the buffer in the subscriber apparatus is large enough to store video data from the beginning to kT. Thus, the maximum size of required buffer is dT. It is because 1≦k≦d.

Figure 4A:
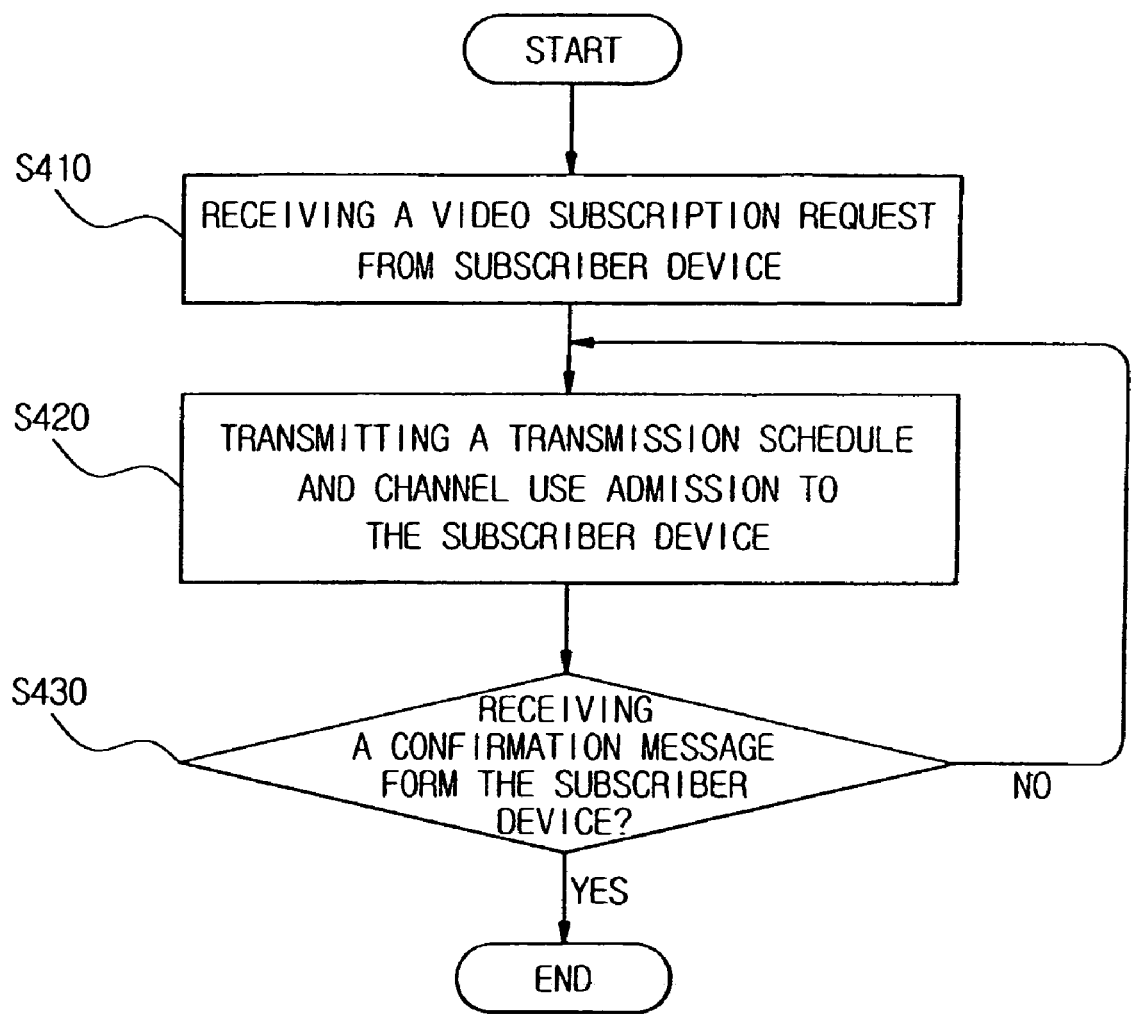
FIG. 4a is a flowchart for showing the operation of the video server when the subscriber apparatus requests a video subscription.
Figure 4B:
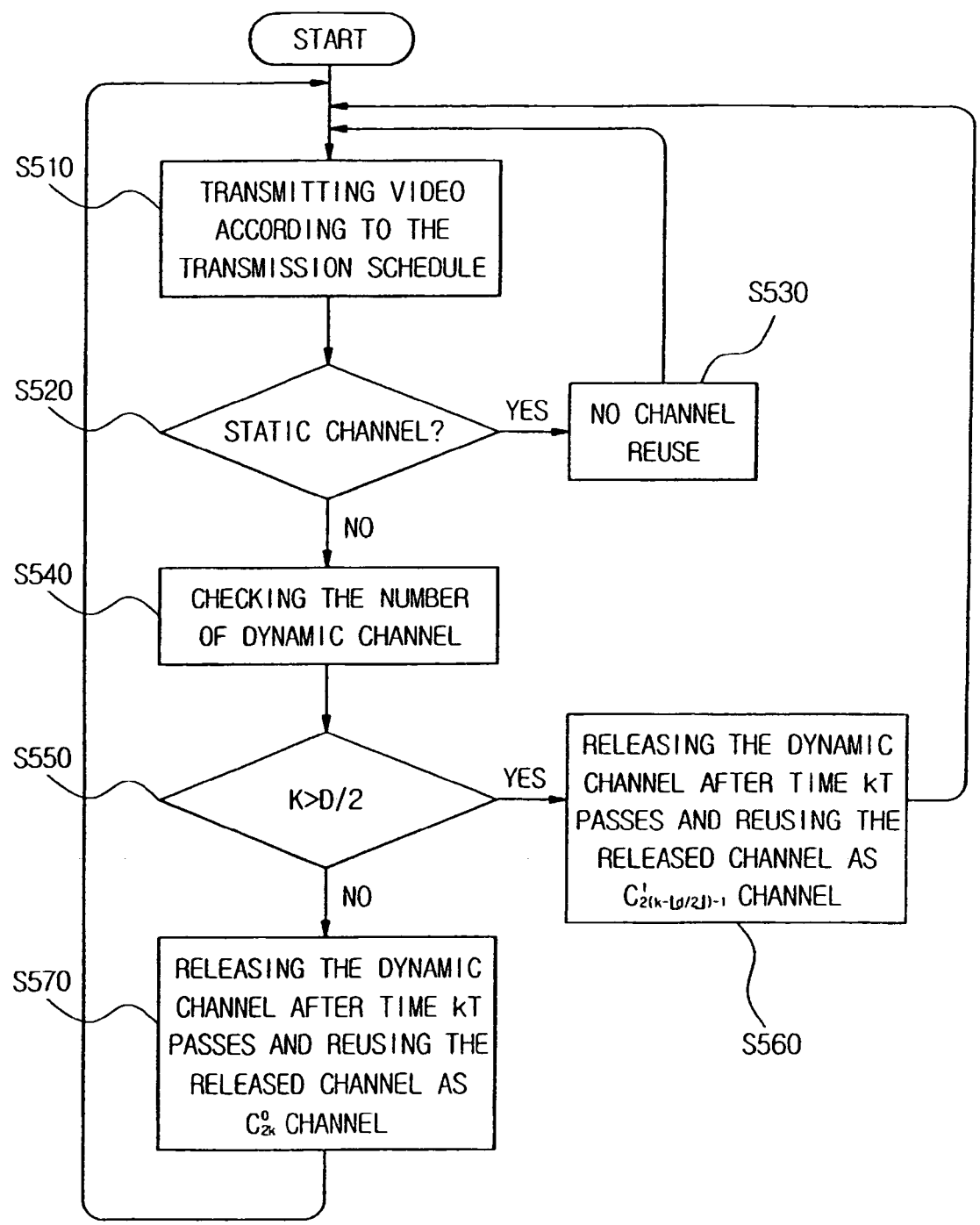
FIG. 4b is a flowchart for showing the channel use operation of the video server.
Figure 5:
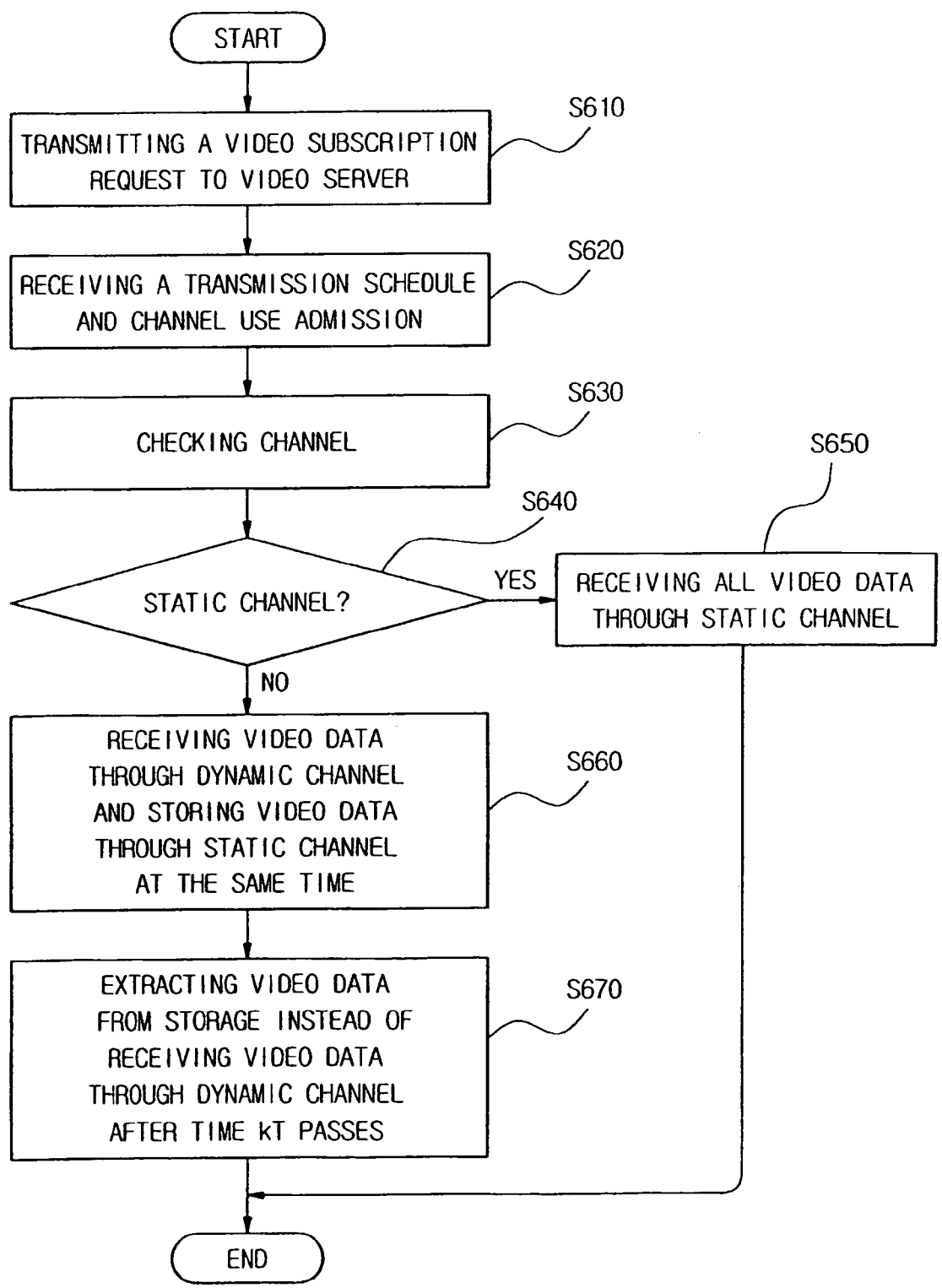
FIG. 5 is a flowchart for showing the operation of the subscriber apparatus.

FIG. 4a to FIG. 5 are flowcharts for showing the operations of the video server and subscriber apparatus. FIG. 4a is a flowchart for showing the operation of the video server when the subscriber apparatus requests a video subscription.

Referring to FIG. 4a, on receiving the video subscription request from the subscriber apparatus (S410), the video server transmits a transmission schedule and a channel use admission to the subscriber terminal (S420). The transmission schedule can comprise each transmission time of requested video and information of channels (i.e., dynamic channel or static channel) that transmit video.

The video server checks a confirmation message corresponding to the transmission schedule and admission from the subscriber apparatus (S430), and if not receiving, then returns to step S420. That is, the video server retransmits the transmission schedule and the channel use admission to the subscriber apparatus.

FIG. 4b is a flowchart for showing the channel use operation of the video server. Referring to FIG. 4b and FIG. 3, the operation of the video server can be described as follows.

The video server transmits video data according to the channel transmission schedule (S510). And, the video server checks that the current channel carrying video data is a static channel or a dynamic channel (S520). If a static channel, the channel is not reused (S530). Namely, the current channel is not released and transmits video data from the beginning to the end (S530).

If not a static channel, the video server checks the number assigned to the dynamic channel (S540). Namely, the video server checks that the number of dynamic channels k is larger than d/2 (S540). Here, the dynamic channel is the 'k' th dynamic channel being assigned after the '0'$^{th}$ static channel. Namely, the dynamic channel can be denoted as $C_k^o$ in FIG. 3. Thus, this dynamic channel starts to transmit video data at time 't'+'kT', which 't' is the start time of the static channel $C_o^o$. As described above, d is the number of dynamic channels between one static channel and the neighboring static channel.

If the number of dynamic channels k is larger than d/2, the current channel is released when time kT passes from the start time of the current channel, and the [2(k−⌊d/2⌋)−1]th channel from the next static channel $C_o^1$ reuses the released channel (S560). Namely, the released channel is reused as $C_{2(k-\lfloor d/2 \rfloor)-1}^1$. If the number of dynamic channel k is not larger than d/2, the current channel is released after time kT from the start time of the current channel, and the [2k]$^{th}$ channel reuses the released channel (S570). Namely, the released channel is reused as $C_{2k}^o$.

Assuming that d is 4 and k is 2, for example, as k (=2) is not larger than d/2 (=2), the dynamic channel $C_2^o$ of which k is 2 will be released after time 2T from the start time of current channel t+2T, i.e., 't+4T', and will be reused as $C_4^o$. Assuming that d is 4 and k is 3, for example, as k (=3) is larger than d/2 (=2), the dynamic channel $C_3^o$ of which k is 3 will be released after time 3T from the start time of current channel t+3T, i.e., 't+6T', and will be reused as $C_1^1$.

Generalizing that the dynamic channel at step S540 in FIG. 4b can be denoted as $C_k^a$, the released channel is reused as $C_{2(k-\lfloor d/2 \rfloor)-1}^{a+1}$ channel if the number of dynamic channel k is larger than d/2, and the released channel is reused as c if the number of dynamic channel k is not larger than d/2.

FIG. 5 is a flowchart for showing the operation of subscriber apparatus.

When the subscriber inputs a video subscription request, the subscriber apparatus transmits the request for the video to the video server (S610). On receiving the transmission schedule and the channel use response (S620), then checks the channel (S630). In one embodiment, the channel check step (S630) comprises checking which channel is the nearest upcoming channel, i.e., the fastest serviceable channel, from the video subscription request. If a current channel, i.e., the nearest upcoming channel is a static channel according to the check (S640), then the subscriber apparatus receives all video data through the static channel (S650). Namely, the subscriber apparatus receives all video data through the static channel without channel switching.

If the current channel is not a static channel, the subscriber apparatus starts to receive video data from the current dynamic channel, and at the same time, receives video data from the static channel that already started to service prior to the current channel and temporarily stores received data in the storage (S660). After a certain period of time (in this case, kT) passes from the start time of receiving video data through the dynamic-channel, the subscriber apparatus displays video data stored in the storage instead of the dynamic channel (S670).

Figure 6A:
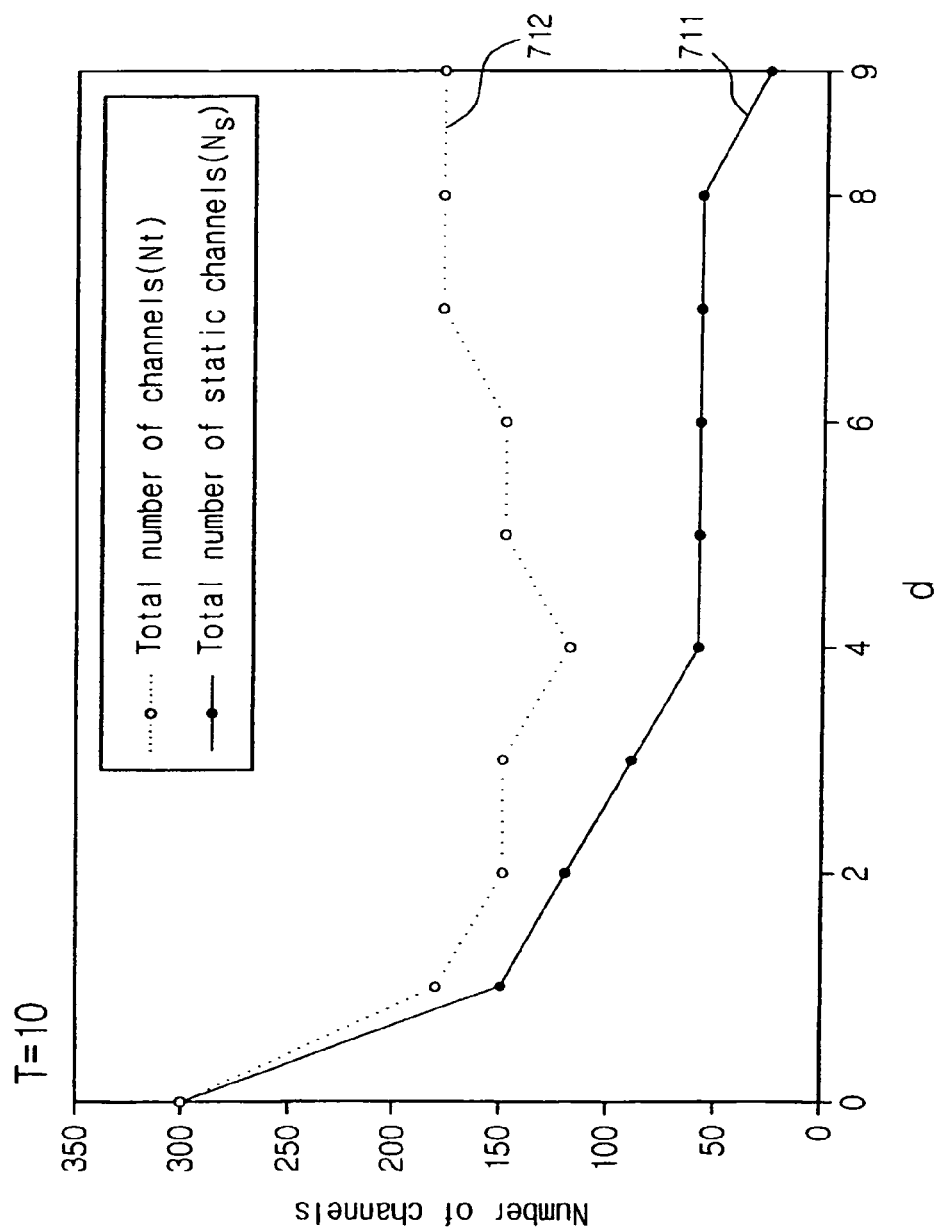
FIG. 6a to 6c are graphs of the number of static channels Ns and the number of total channels Nt when the number of dynamic channels d changes.
Figure 6B:
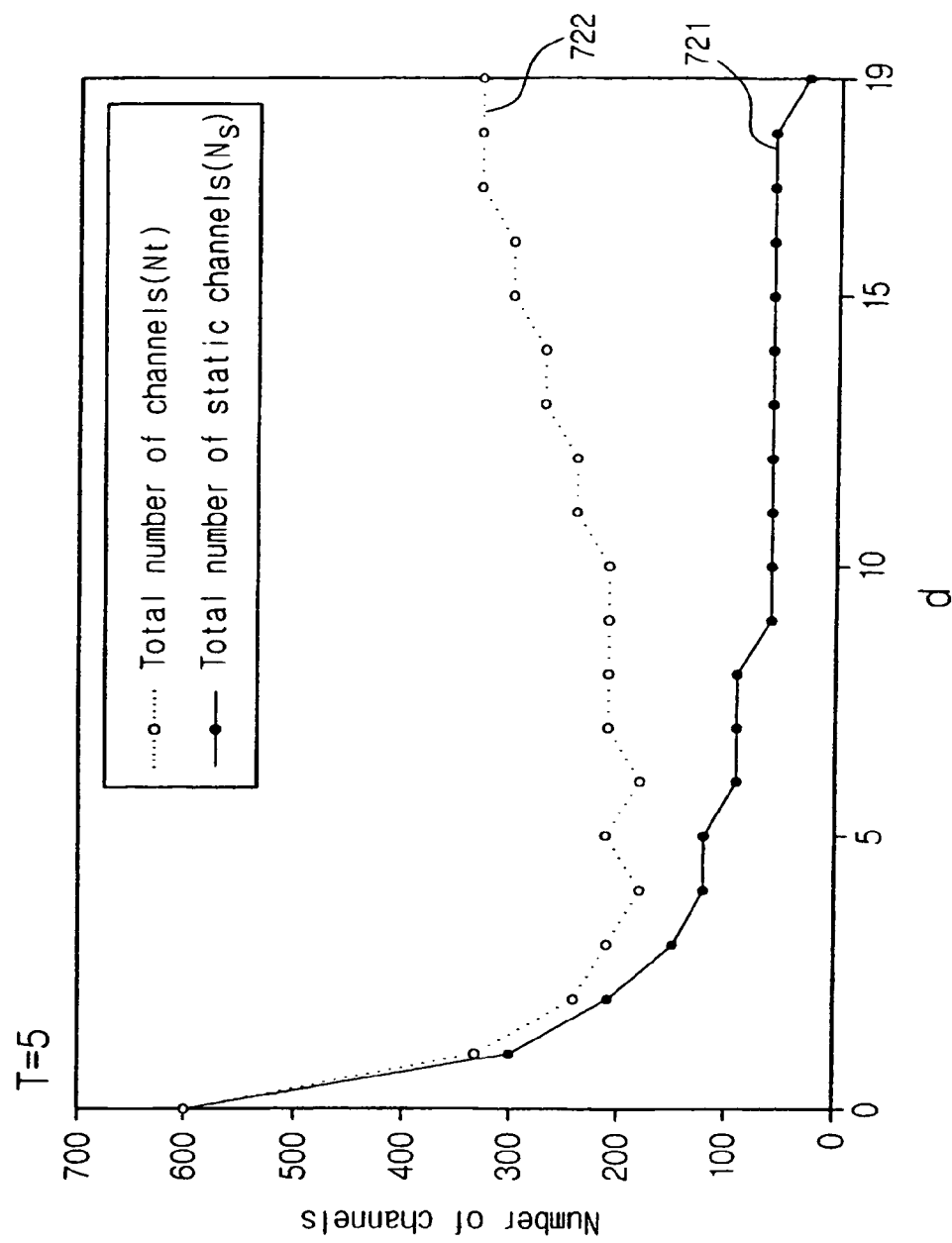
Figure 6C:
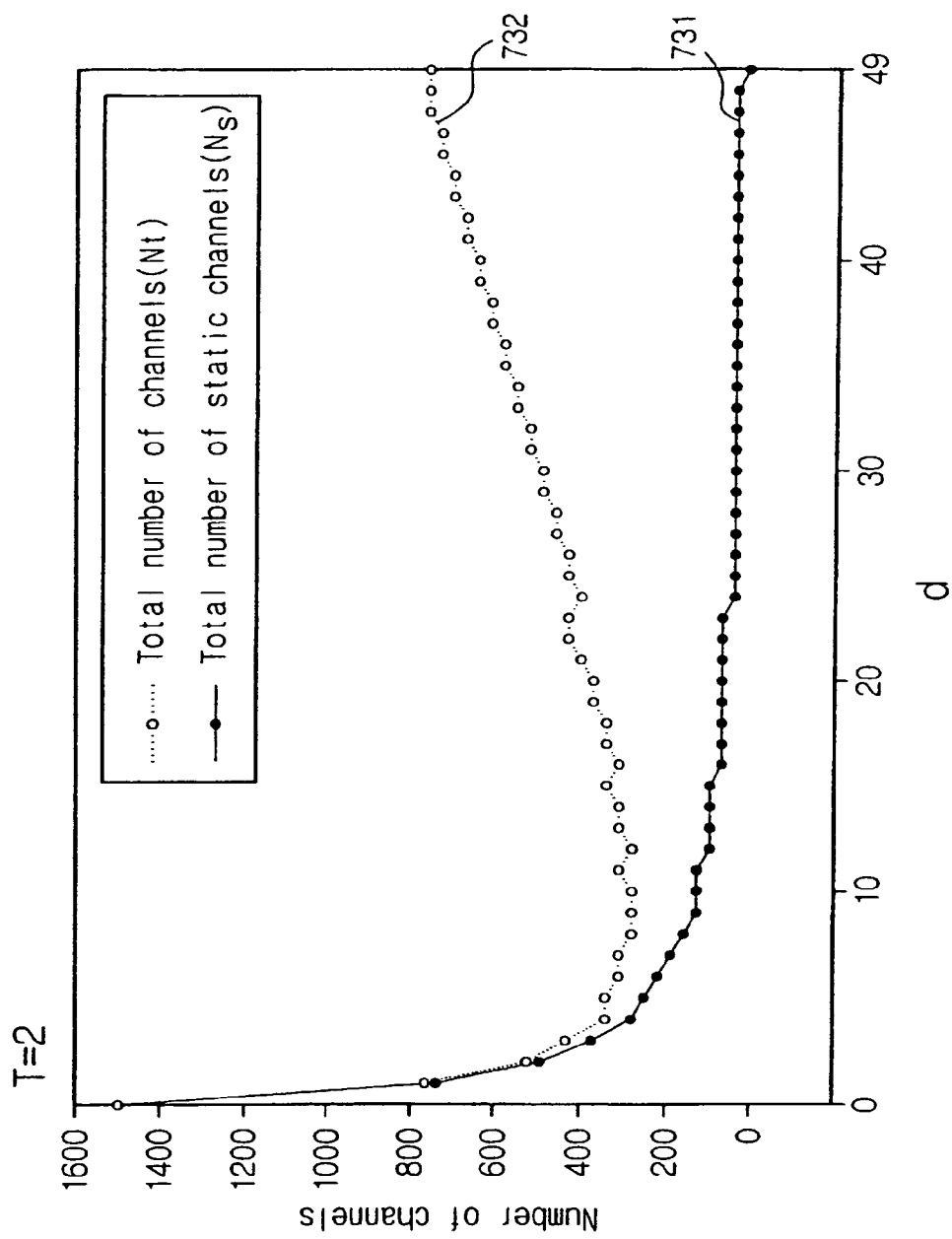

FIG. 6a to 6c are graphs of the number of static channels Ns and the number of total channels Nt when the number of dynamic channels d changes.

Here, assume that the number of videos M is 30 and the length D of each video is 100 minutes. The number of dynamic channels d varies from 0 to the maximum value. If there is no dynamic channel in d=0, this corresponds to the conventional NVoD system.

In FIG. 6a, the channel repetition period, i.e., the maximum waiting time T is 10 minutes. The maximum number of dynamic channels d will be 9 from Eqation1 and 2. When d varies from 0 to 9, graphs for Ns and Nt are denoted as '711' and '712', respectively. At d=4, the total channels Nt has the minimum value. And the number of total channels Nt is 120. Thus, according to the one embodiment of the present invention, VoD system can be embodied with 120 channels. On the other hand, there are 300 channels in the conventional NVoD system (d=0). That is, in order to embody VoD system with same condition, 300 channels are required. Thus, when using the present invention, VoD system can be made with 40% of channels of the conventional NVoD system.

In FIG. 6b, the channel repetition period, i.e., the maximum waiting time T is 5 minutes. The maximum number of dynamic channels d will be 19. When d varies from 0 to 19, graphs for Ns and Nt are denoted as '721' and '722', respectively. At d=4 and 6, the total channels Nt has the minimum value. And the number of total channels Nt is 180. Thus, according to the one embodiment of the present invention, VoD system can be embodied with 180 channels. On the other hand, there are 600 channels in the conventional NVoD system (d=0). Thus, when using the present invention, VoD system can be made with 30% of channels of the conventional NVoD system.

In FIG. 6c, the channel repetition period, i.e., the maximum waiting time T is 2 minutes. The maximum number of dynamic channels d will be 49. When d varies from 0 to 49, graphs for Ns and Nt are denoted as '731' and '732', respectively. At d=8, 9, 10 and 12, the total channels Nt has the minimum value. And the number of total channels Nt is 300, so comparing to the conventional NVoD system (d=0) of 1500 channels, the required channels are 20% of conventional NVoD system. Thus, when using the present invention, VoD system can be made with 20% of channels of the conventional NVoD system.

Referring FIGS. 6a and 6c again, when providing 30 100-minutes-length videos with same number of channels, the waiting time of the conventional NVoD system and VoD system according to the present invention can be compared to each other.

In FIG. 6a, the case of d=0 corresponds to the conventional NVoD system, and 300 channels are required to transmit 30 100-minutes-length videos by 10 minutes of a repetition period in the conventional system. In FIG. 6c, the case of d=8, 9, 10, 12, 300 channels are required to transmit 30 100-minutes-length videos by 2 minutes of a repetition period.

That is, in one embodiment, comparing to the conventional NVoD system, the maximum waiting time that the subscriber should wait to watch video can be reduced ⅕ of the conventional waiting time.

One embodiment of the present invention can be applied to VoD broadcasting in the NVoD scheme as described in the embodiments. Another embodiment of the present invention can be applied to a multimedia data broadcasting that transmits multimedia data, except video or movie, on demand.

According to one embodiment of the present invention, without increasing the waiting time of a subscriber or reducing the total number of video data to be transmitted, it is possible to provide a NVoD service with fewer channels. That is, in the VoD system using one embodiment of the present invention, the efficiency of the channel bandwidth under the same condition (same waiting time, same number of movies, same movie length) can be increased considerably. In other words, the waiting time of the subscriber, comparing to the conventional NVoD, can be significantly reduced if the movie length and the number of channels are the same.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

The invention claimed is:

1. A method of serving multimedia data on demand, comprising:

continuously transmitting, at a multimedia data server device, the multimedia data from the beginning to the end via a first static channel at a first static channel transmission point;

transmitting, at the multimedia data server, a portion of the multimedia data from the beginning via a first to $d^{th}$ dynamic channel at a first to $d^{th}$ dynamic channel transmission point, wherein d is a natural number not less than 1;

reusing, at the multimedia data server, the $k^{th}$ dynamic channel as another dynamic channel after releasing the $k^{th}$ dynamic channel to be available after Tk from the $k^{th}$ dynamic channel transmission point, wherein the Tk is not less than an elapsed time from the first static channel transmission point to the $k^{th}$ dynamic channel transmission point, wherein k is greater than 1 and less than d; and continuously transmitting, at the multimedia data server, the multimedia data from the beginning to the end via a second static channel at a second static channel transmission point, wherein each of the first to the $d^{th}$ dynamic channels among plural channels is available at each dynamic channel transmission point, and wherein the $k^{th}$ dynamic channel transmission point is located at any point between the first static channel transmission point and the second static channel transmission point and becomes closer to the second static channel transmission point as k increases.

2. The method of claim 1, wherein the $k^{th}$ dynamic channel transmission point has a time interval of '$k \times T$' from the first static channel transmission point, and wherein T is a real number not less than 0.

3. The method of claim 2, wherein d is a minimum value satisfying the following equation:

$$\left\lceil \frac{D}{T(d+1)} \right\rceil + \left\lceil \frac{d}{2} \right\rceil$$

where, D is a time indicating a length of the multimedia data.

4. The method of claim 1, wherein $T_k$ is '$k \times T$'.

5. A method of serving multimedia data on demand, comprising:

continuously transmitting the multimedia data from the beginning to the end via a first static channel at a first static channel transmission point;

transmitting a portion of the multimedia data from the beginning via a first to $d^{th}$ dynamic channel at a first to $d^{th}$ dynamic channel transmission point, wherein d is a natural number not less than 1;

reusing the $k^{th}$ dynamic channel as another dynamic channel after releasing the $k^{th}$ dynamic channel to be available after Tk from the $k^{th}$ dynamic channel transmission point, wherein the Tk is not less than an elapsed time from the first static channel transmission point to the $k^{th}$ dynamic channel transmission point, wherein k is greater than 1 and less than d;

continuously transmitting the multimedia data from the beginning to the end via a second static channel at a second static channel transmission point;

receiving a video subscription request from a subscriber apparatus; and transmitting a transmission schedule in response to the video subscription request to the subscriber apparatus, wherein the transmission schedule comprises at least one of the first and the second static channel transmission points, and the first to the $d^{th}$ dynamic channel transmission points, wherein each of the first to the $d^{th}$ dynamic channels among plural channels is available at each dynamic channel transmission point, and wherein the $k^{th}$ dynamic channel transmission point is located at any point between the first static channel transmission point and the second static channel transmission point and becomes closer to the second static channel transmission point as k increases.

6. A method of serving multimedia data on demand, comprising:

transmitting, at a multimedia data server device, the entire multimedia data via a first and a second static channel;

transmitting, at the multimedia data server, a portion of the multimedia data via a first to a $d^{th}$ dynamic channel that is located between the first and second static channels, wherein d is a natural number not less than 1; and releasing, at the multimedia data server, the first to the $d^{th}$ dynamic channel(s), wherein the first static channel, the first to the $d^{th}$ dynamic channel(s) and the second static channel successively start to transmit the multimedia data by an interval of T, wherein T is a real number not less than 0, and wherein the first to the $d^{th}$ dynamic channel(s) can be reused after being released.

7. The method of claim 6, wherein the $k^{th}$ ($1 \leq k \leq d$) dynamic channel is released after time kT passes from the $k^{th}$ dynamic channel transmission point.

8. The method of claim 6, wherein the $k^{th}$ ($1 \leq k \leq d$) dynamic channel is reused before the second static channel if k is not greater than d/2 and after the second static channel if k is greater than d/2.

9. A computer-readable medium including a program containing computer-executable instructions in a multimedia data server for performing method of serving multimedia data on demand, the method comprising:

continuously transmitting the multimedia data from the beginning to the end via a first static channel at a first static channel transmission point;

transmitting a portion of the multimedia data from the beginning via a first to $d^{th}$ dynamic channel at a first to $d^{th}$ dynamic channel transmission point, wherein d is a natural number not less than 1;

reusing a $k^{th}$ dynamic channel as another dynamic channel after releasing the $k^{th}$ dynamic channel to be available after time Tk passes from the $k^{th}$ dynamic channel transmission point, wherein the time Tk is not less than an elapsed time from the first static channel transmission point to the $k^{th}$ dynamic channel transmission point, and wherein k is a natural number not less than 1 and not greater than d; and continuously transmitting the multimedia data from the beginning to the end via a second static channel at a second static channel transmission point, wherein each of the first to the $d^{th}$ dynamic channel(s) among plural channels is available at each dynamic channel transmission point, and wherein the $k^{th}$ dynamic channel transmission point is located at any point between the first static channel transmission point and the second static channel transmission point and becomes close to the second static channel transmission point as k increases.

10. A method of serving multimedia data on demand, comprising:

transmitting a portion of a multimedia data stream from the beginning of the data stream to a subscriber device via at least one dynamic channel between two adjacent static channels, wherein the at least one dynamic channel is reusable after release from the communication with the subscriber device, and wherein the entire multimedia data is transmitted to the subscriber device via the static channels;

transmitting a portion of the multimedia data via a first dynamic channel to a $d^{th}$ dynamic channel that is located between first and second static channels, wherein d is a natural number greater than 1; and releasing the first dynamic channel to the $d^{th}$ dynamic channels, wherein the first static channel, the first dynamic channel to the $d^{th}$ dynamic channels and the second static channel successively start to transmit the multimedia data by an interval of T, wherein T is a real number not less than 0.

* * * * *